Nov. 16, 1965   R. H. GANZ   3,217,860
METHOD AND MACHINE FOR POSITIONING ARTICLES TO BE PACKAGED
Original Filed Aug. 3, 1960   5 Sheets-Sheet 1

INVENTOR
ROBERT H. GANZ
BY
ATTORNEY

Nov. 16, 1965     R. H. GANZ     3,217,860
METHOD AND MACHINE FOR POSITIONING ARTICLES TO BE PACKAGED
Original Filed Aug. 3, 1960     5 Sheets-Sheet 2

INVENTOR
ROBERT H. GANZ
BY
ATTORNEYS

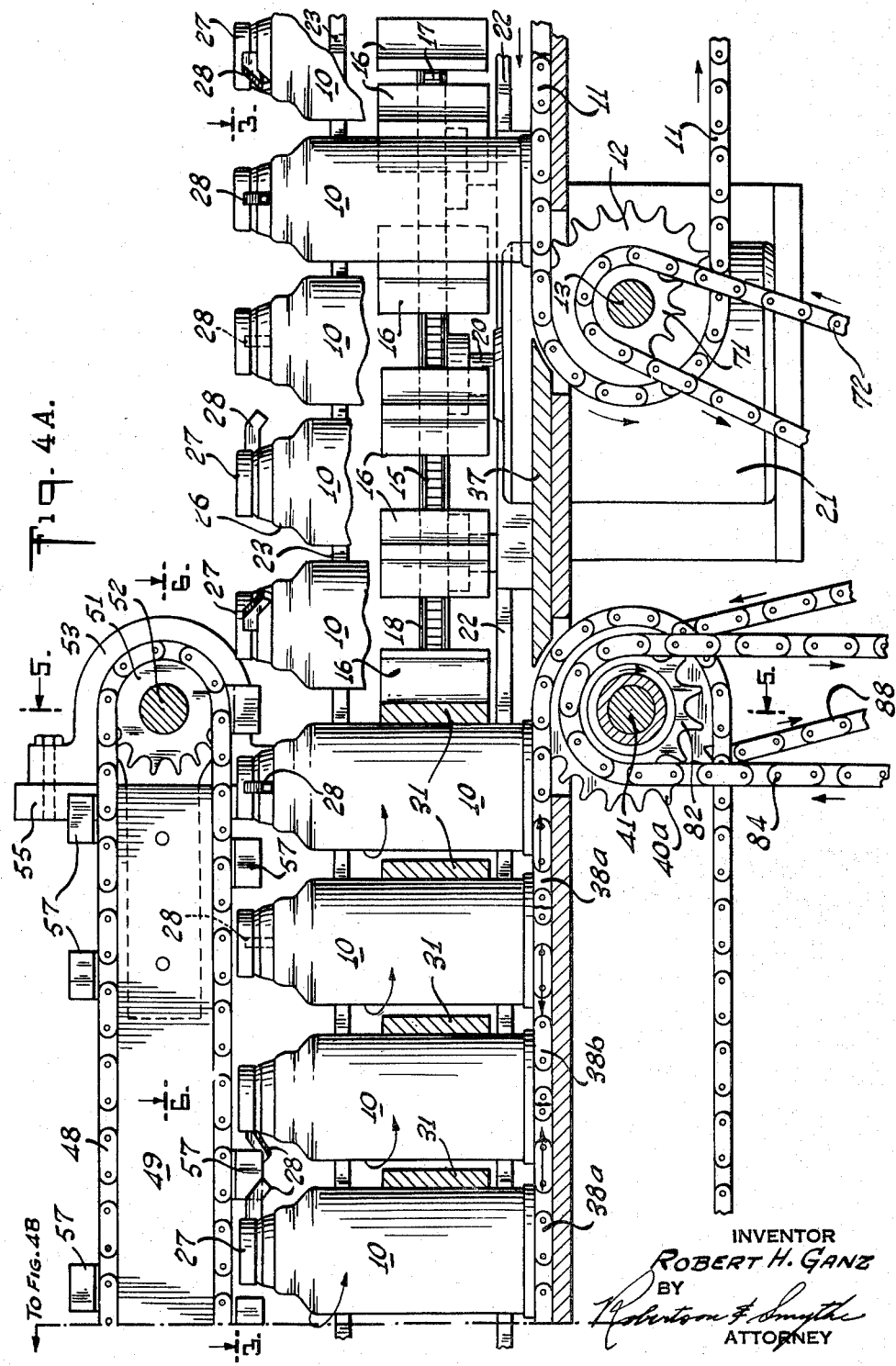

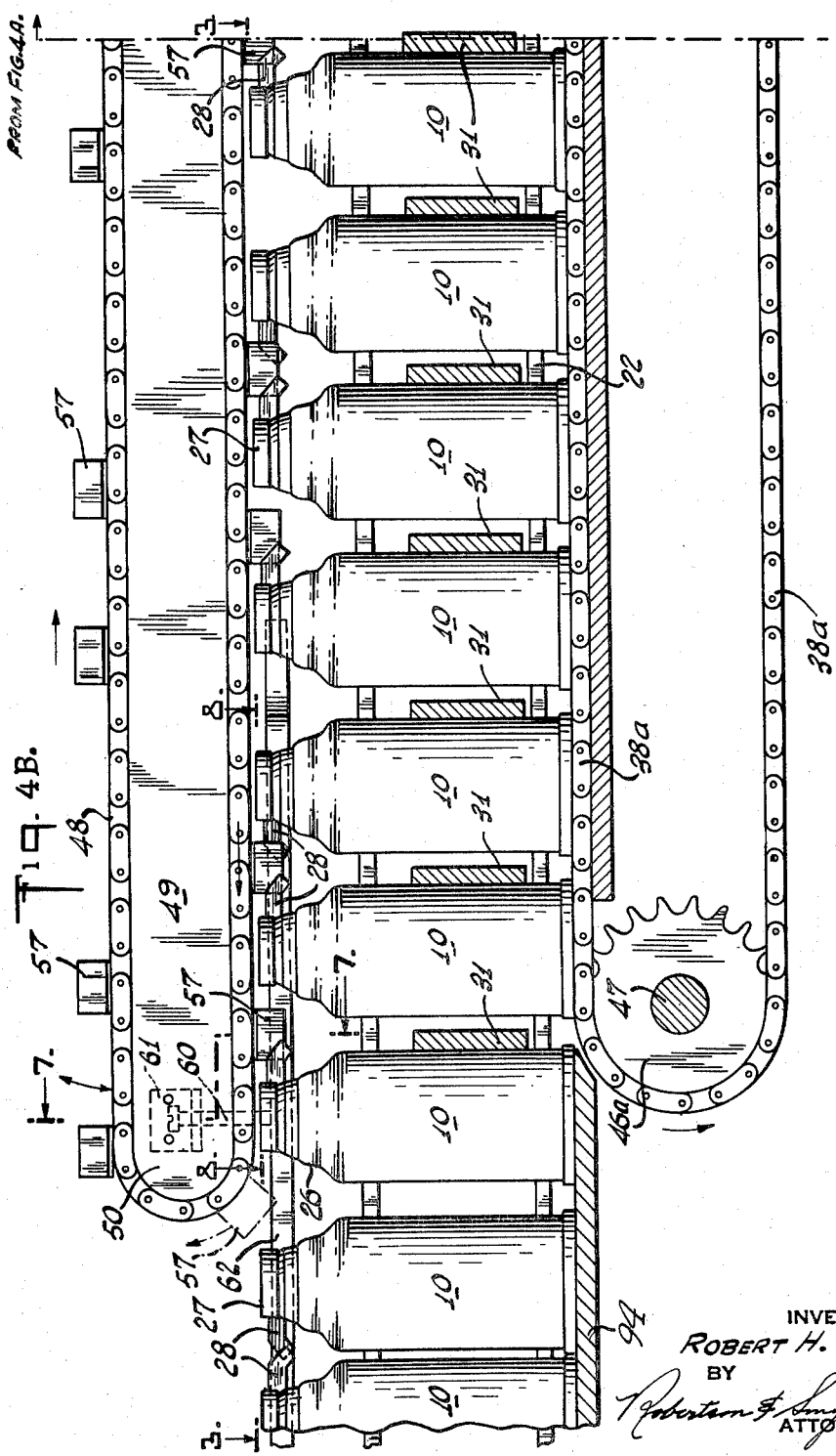

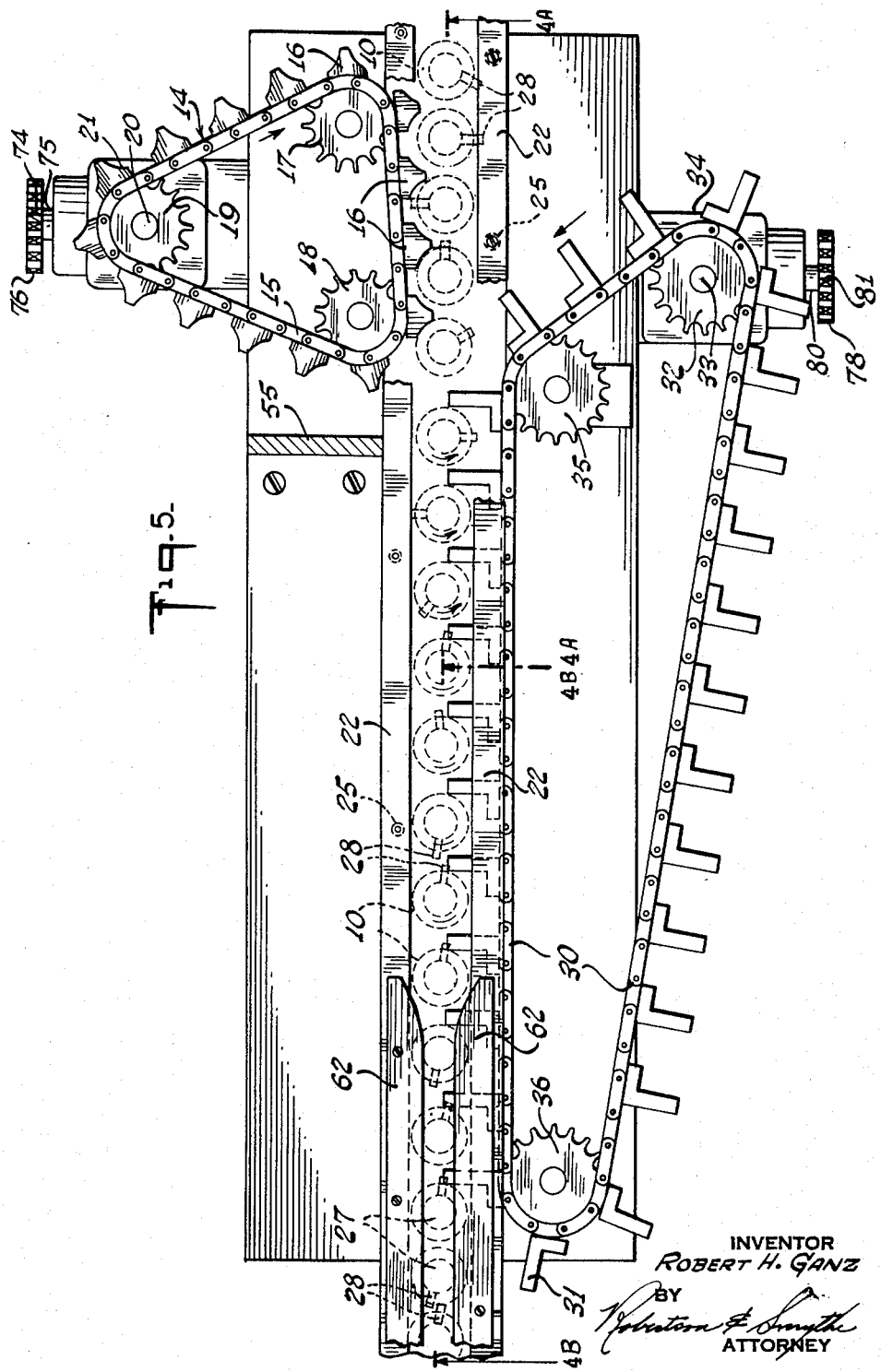

United States Patent Office 3,217,860
Patented Nov. 16, 1965

3,217,860
METHOD AND MACHINE FOR POSITIONING ARTICLES TO BE PACKAGED
Robert Henry Ganz, Bergenfield, N.J., assignor to Continental Can Company, Inc., New York, N.Y., a corporation of New York
Original application Aug. 3, 1960, Ser. No. 47,295, now Patent No. 3,119,482, dated Jan. 28, 1964. Divided and this application Oct. 4, 1963, Ser. No. 313,884
2 Claims. (Cl. 198—171)

This application is a division of my application, Serial No. 47,295, filed August 3, 1960, Patent No. 3,119,482, granted January 28, 1964. The invention relates to the positioning of containers and the like having spouts or other portions extending beyond the side portions of the containers prior to packaging, and particularly to a conveyor having means associated therewith to prevent or minimize rotation of such containers. My invention has special application for use with packaging in paperboard cartons of the wrap-around type since with such a carton, it is necessary that the spouts or extending portions be positioned to prevent interference with the carton during its application to the containers.

Summary

In accordance with my invention, the containers having top portions with radially extending spouts arranged in predetermined orientation to prevent interference with the carton by the means described and claimed in my prior Patent No. 3,119,482, aforesaid, are advanced by a conveyor between spaced guide members which prevent any further rotation of the containers that could change such predetermined orientation. Orientation of the spouts is maintained beyond the point of termination of such guide members by means of a support plate having sharp edges on the surface in contact with the container bottom. While between the guide rails the containers travel beyond the end portion of the container conveyor and come in contact with the adjacent containers while maintaining the positioning of the spout. At this point the containers are ready for delivery into the packaging machine for application of the wrap-around carton. The packaging machine is synchronized to receive the containers in the order that the spouts have been positioned so as to insure that the end containers have spouts turned inwardly with respect to the carton.

Description

In the drawings, I have illustrated a machine to show the best mode contemplated by me of carrying out my invention.

FIGS. 4A and 4B, when connected together, show the container conveyor.

FIG. 5 is a horizontal sectional view of the machine taken along the line 3—3 in FIGS. 4A and 4B.

Figure 3:
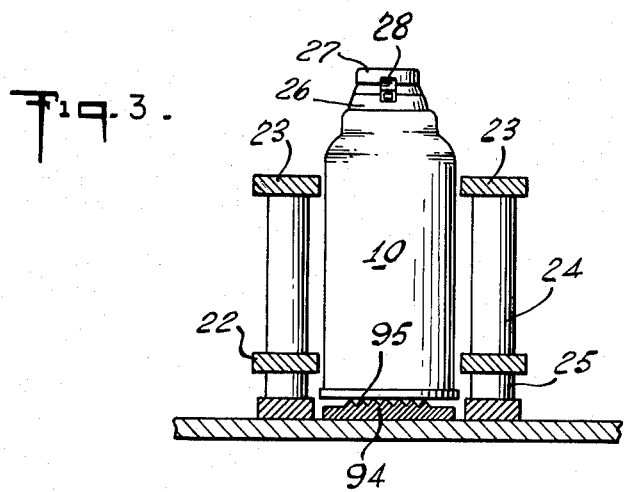
FIG. 3 is a sectional view of the grooved support plate.

The containers are constrained to travel in a row by means of parallel spaced lower guides 22 and upper guides 23 (FIG. 3). The upper guide which is disposed adjacent to the feeder device of my Patent No. 3,119,482, aforesaid, is supported by spacers 24 while the other upper guide is supported by attachment to the machine frame members (not shown). Lower guides 22 are supported by spacers 25.

The means for conveying the containers through the machine includes conveyor 30 (FIG. 5) to which is attached pusher members 31 at intervals of sufficient distance that the spouts of each of the containers are provided with clearance to the spouts of the adjacent containers. Container conveyor 30 is driven by drive sprocket 32 mounted upon shaft 33 which extends from miter gear box 34. Container conveyor 30 is positioned to have a line of travel parallel to the guides 22 and 23 by means of sprockets 35 and 36. When engaged with the containers, pusher members 31 advance in a line of direction located between lower and upper guides, 22 and 23 (FIG. 3).

Containers 10 have upper portions 26 to which are attached caps 27. To facilitate the dispensing of the liquid or other material contained within the container, cap 27 is provided with spout 28 extending radially therefrom. For convenience and ease of handling, spout 28 may extend beyond the perimeter of container 10 (FIGS. 1 and 2).

It is evident that in order to apply a close fitting wrap-around carton blank 29 about a group of containers, it is necessary that spouts 28 be oriented with respect to carton blank 29 so as to eliminate any interference with the blank. At the same time in order to protect the spouts by precluding the possibility of the spouts projecting beyond the end portions of the carton, it is necessary that the spouts of the end containers in a group enclosed in carton blank 29 be directed inwardly with respect to the carton blank. Means by which this arrangement of the spouts can be secured is described in my prior patent aforesaid. Thereafter the spouts enter between the spout guide rails 62 (FIG. 1). This occurs before the containers leave the control of stop members 57 so as to insure that the positioning of the spouts, once established, is maintained during the remainder of the travel of the containers through the machine. Spout guide rails 62 are positioned above upper guides 23 by suitable supporting means.

Figure 1:
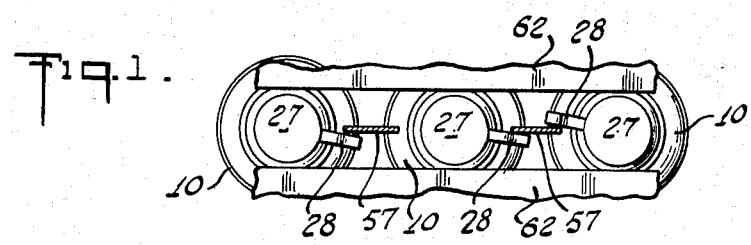
FIG. 1 is a horizontal sectional view showing the container spouts positioned in the desired predetermined orientation.
Figure 2:
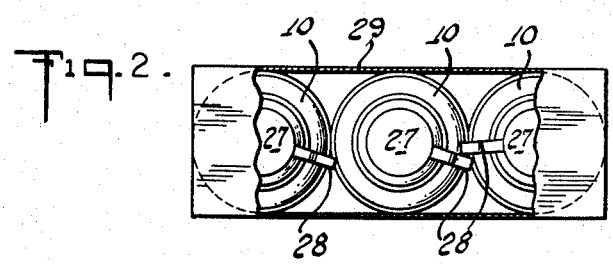
FIG. 2 is a horizontal sectional view showing the containers disposed within the carton with the spouts positioned inwardly.

Guide rails 62 prevent further rotation of the spouts (FIG. 1). To provide access to the containers, it may be necessary to terminate guide rails 62 but at the same time, it is essential that the orientation of spouts 28 be maintained. To accomplish this, containers 10 are advanced beyond guide rails 62 and onto support plate 94 containing sharp edges 95 on the surface in contact with the container bottoms (FIG. 3). Edges 95 advantageously have a saw-tooth cross-section extending parallel to the longitudinal axis of support plate 94. The sharp edges guide the containers and prevent rotation of them as they advance. Since the edges contact the central bottom portion of the containers, the tendency for the containers to rotate is minimized. For the case where the containers are provided with a surface finish such as enamel or lacquer, the grooves can be formed with sufficiently sharp edges to lightly scribe the finish, thereby providing a mechanical engagement between the containers and the edges. The containers are then discharged from the machine with their spouts properly positioned to permit the subsequent application of a wrap-around carton blank.

I claim:

1. A conveying device for articles of generally cylindrical form including a plate member freely supporting the articles to be conveyed, spaced parallel guides adjacent said plate members to receive said articles in a single line sliding between said guides, the upper surface of said plate member having a plurality of sharp edge portions extending parallel to the path of travel of the articles and contacting the bottoms of said articles, and pusher members for moving the articles along said plate member between said parallel spaced guides and in sliding contact with said sharp edge portions of the plate member whereby rotation of the articles around an axis perpendicular to the supporting surfaces of said plate member is restrained solely by the scribing effect of said sharp edge portions upon the bottoms of said articles.

2. A conveying device according to claim 1, in which said sharp edge portions are confined to a central area of the bottoms of the articles whereby any tendency of the articles to rotate is minimized.

References Cited by the Examiner
UNITED STATES PATENTS

| | | | |
|---|---|---|---|
| 1,391,141 | 9/1921 | Paulson | 198—159 X |
| 1,752,612 | 4/1930 | Owens | 198—204 |

SAMUEL F. COLEMAN, *Primary Examiner.*
ERNEST A. FALLER, *Examiner.*